United States Patent
Cox et al.

(10) Patent No.: US 6,253,323 B1
(45) Date of Patent: *Jun. 26, 2001

(54) OBJECT-BASED DIGITAL SIGNATURES

(75) Inventors: George W. Cox; David W. Aucsmith, both of Portland, OR (US); Paul E. Onnen, Burnsville, MN (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/742,981

(22) Filed: Nov. 1, 1996

(51) Int. Cl.$^7$ ............... H04L 9/00; G06F 11/30
(52) U.S. Cl. ............ 713/176; 713/168; 713/201
(58) Field of Search ............... 380/4; 713/180, 713/167, 168, 176, 201

(56) References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,315,310 | 2/1982 | Bayliss et al. | 364/200 |
| 4,325,120 | 4/1982 | Colley et al. | 364/200 |
| 4,387,427 | 6/1983 | Cox et al. | 364/200 |
| 4,402,046 | 8/1983 | Cox et al. | 364/200 |
| 4,405,829 | 9/1983 | Rivest et al. | 380/30 |
| 4,424,414 | 1/1984 | Hellman et al. | 380/30 |
| 4,803,622 | 2/1989 | Bain, Jr. et al. | 364/200 |
| 4,829,425 | 5/1989 | Bain, Jr. et al. | 364/200 |
| 4,995,082 | 2/1991 | Schnorr | 380/23 |
| 5,005,200 | * 4/1991 | Fischer | 380/30 |
| 5,224,163 | * 6/1993 | Gasser et al. | 380/30 |
| 5,367,573 | * 11/1994 | Quimby | 380/25 |
| 5,535,276 | * 7/1996 | Ganesan | 380/25 |
| 5,621,798 | 4/1997 | Aucsmith | 380/25 |
| 5,634,043 | 5/1997 | Self et al. | 395/559 |
| 5,663,553 | 9/1997 | Aucsmith | 235/492 |
| 5,663,896 | 9/1997 | Aucsmith | 395/187.01 |
| 5,701,464 | 12/1997 | Aucsmith | 395/610 |
| 5,712,800 | 1/1998 | Aucsmith | 64/514 |
| 5,712,914 | 1/1998 | Aucsmith et al. | 380/30 |
| 5,754,658 | 5/1998 | Aucsmith | 380/28 |
| 5,757,915 | 5/1998 | Aucsmith et al. | 380/25 |
| 5,878,144 | 3/1999 | Aucsmith et al. | 380/30 |
| 5,892,899 | 4/1999 | Aucsmith et al. | 395/186 |
| 5,896,533 | 4/1999 | Ramos et al. | 395/680 |
| 5,915,018 | 6/1999 | Aucsmith | 380/4 |
| 5,933,502 | 8/1999 | Aucsmith et al. | 380/23 |
| 5,936,226 | 8/1999 | Aucsmith | 235/492 |
| 5,940,513 | 8/1999 | Aucsmith et al. | 380/25 |
| 5,949,877 | 9/1999 | Aucsmith et al. | 380/4 |
| 5,991,403 | 11/1999 | Aucsmith | 380/10 |
| 6,021,491 | * 2/2000 | Renaud | 713/179 |
| 6,041,122 | 3/2000 | Aucsmith et al. | 380/44 |
| 6,134,551 | 10/2000 | Aucsmith | 395/600 |
| 6,178,509 | 1/2001 | Pfotenhauer et al. | 713/200 |
| 6,205,550 | 3/2001 | Pfotenhauer et al. | 713/200 |

OTHER PUBLICATIONS

Schneier Applied Cryptography Oct. 18, 1995, pp. 185–187.*
U.S. application No. 08/909,338, filed Aug. 11, 1997.
U.S. application No. 08/924,167, filed Sep. 5, 1997.
U.S. application No. 09/127,572, Aucsmith et al., filed Jul. 31, 1998.
U.S. application No. 08/507,962, Knauerhase et al., filed Jul. 27, 1995.
U.S. application No. 08/906,134, Knauerhase et al., filed Jul. 25, 1997.

* cited by examiner

Primary Examiner—Gail Hayes
Assistant Examiner—Bryan Latham
(74) Attorney, Agent, or Firm—Paul Churilla

(57) ABSTRACT

Briefly, in accordance with one embodiment of the invention, a method of using a digital signature includes: electronically referencing at least one plurality of electronic signals with a digital signature remotely stored from the plurality.

26 Claims, 7 Drawing Sheets

OBJECT-BASED DIGITAL SIGNATURES

BACKGROUND OF THE INVENTION

1. Field of the Invention

The present invention relates to encryption and, more particularly, to digital signatures.

2. Background Information

Encryption, digital signatures, and digital certificates are well-known. See, for example, APPLIED CRYPTOGRAPHY, written by Bruce Schneier, available from John Wiley and Sons, Inc. (1994), herein incorporated by reference. The state of the art notion of a digital signature is as encrypted, electronic signals, physically stored with a collection of electronic signals in an electronic file. The digital signature provides verification or validation with respect to the collection. A need, however, exists for a method of using a digital signature that provides greater flexibility than current approaches.

SUMMARY OF THE INVENTION

Briefly, in accordance with one embodiment of the invention, a method of using a digital signature includes: electronically referencing at least one plurality of electronic signals with a digital signature remotely stored from the plurality.

BRIEF DESCRIPTION OF THE DRAWINGS

The subject matter regarded as the invention is particularly pointed out and distinctly claimed in the concluding portion of the specification. The invention, however, both as to organization, and method of operation, together with objects, features, and advantages thereof, may best be understood by reference to the following detailed description, when read with the accompanying drawings in which:

DETAILED DESCRIPTION OF THE INVENTION

Figure 1:
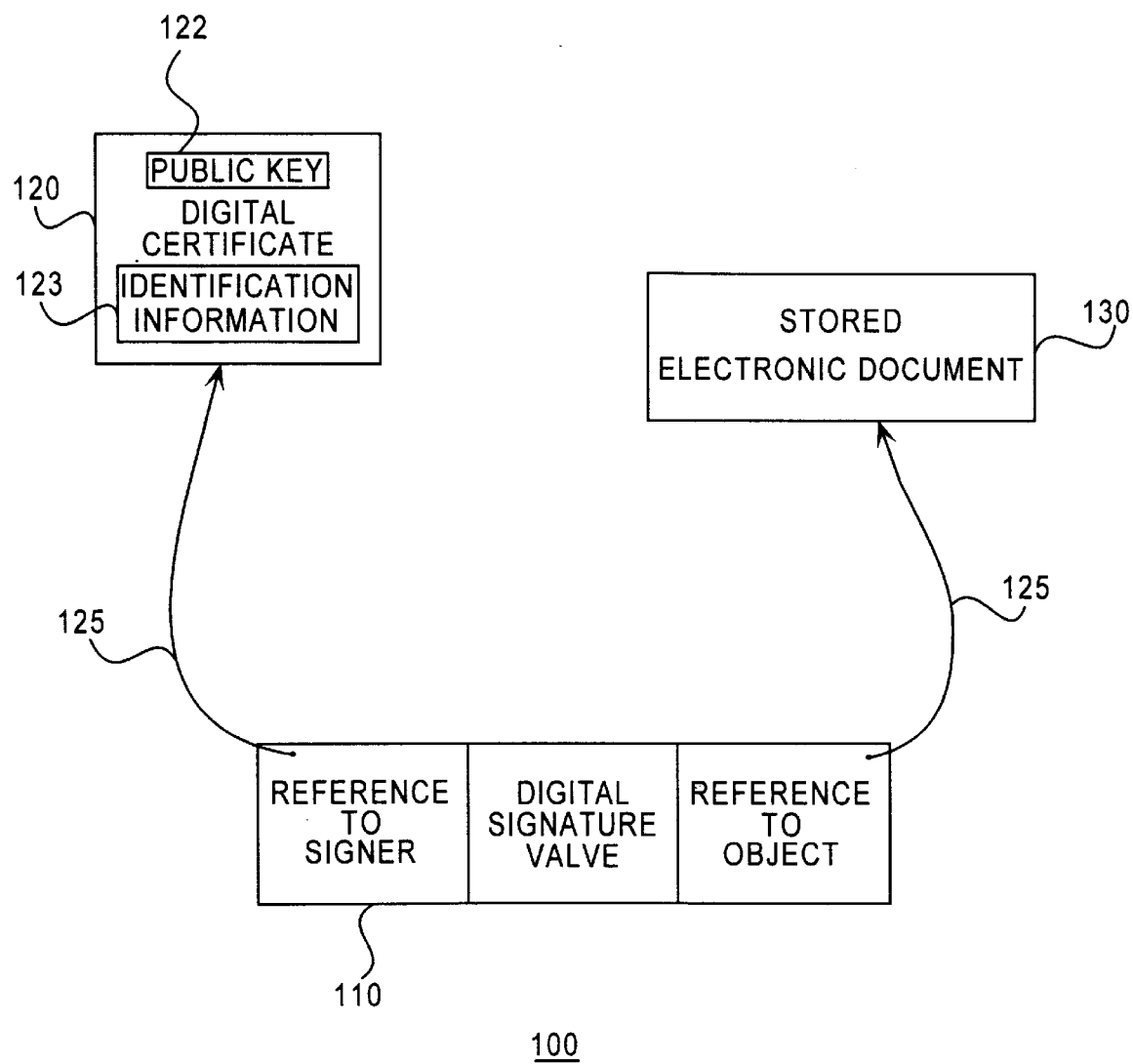
FIG. 1 is a schematic diagram illustrating an embodiment of an object-based digital signature in accordance with the present invention.

In the following detailed description numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Some portions of the detailed description which follow are presented in terms of algorithms and symbolic representations of operations on data bits or binary digital signals stored within a computing system memory, such as a computer memory. These algorithmic descriptions and representations are the means used by those skilled in the data processing arts to convey the substance of their work to others skilled in the art. An algorithm is here, and generally, considered to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise, as apparent from the following discussions, it is appreciated that throughout the specification, discussions utilizing terms such as "processing" or "computing" or "calculating" or "determining" or the like, refer to the action and processes of a computer system, or similar electronic computing device, that manipulate and transform data represented as physical electronic) quantities within the computing system's registers and/or memories into other data similarly represented as physical quantities within the computing system's memories, registers or other such information storage, transmission or display devices.

As previously indicated, encryption, digital signatures, and digital certificates are well-known. Likewise, the state of the art notion of a digital signature is as encrypted, electronic signals physically appended to or stored with a collection of electronic signals, such as in an electronic file resident on a particular platform. In this context, a "document" refers to an electronic document in the form of a plurality of electronic signals that are stored or physically reside in substantially the same location, such as in a file on a particular platform or computer system, for example. Such a platform may include, for example, an execution unit, such as a microprocessor, coupled to one or more storage media, such as via a system bus. Likewise, "signing" a "document" in this context refers to appending or associating a digital signature with the plurality of stored electronic signals so that the digital signature resides in substantially the same location as the "document", such as stored in the same file on the platform. As is well-known, an electronic file comprises a related set of electronic signals stored together and electronically referenced by a name or identifier. Therefore, the digital signature is physically stored with the electronic signals to which it is associated, e.g., with the document that was signed. Likewise, as is well-known, the digital signature value is the result of encrypting the cryptographic hash value of the document being signed. See, for example, Schneier, Chapter 13, "More Public-Key Algorithms". Typically, the digital signature value is encrypted using a private key having a corresponding public key that may be employed to reverse or undo the encryption. This approach has several disadvantages or drawbacks.

Figure 3:
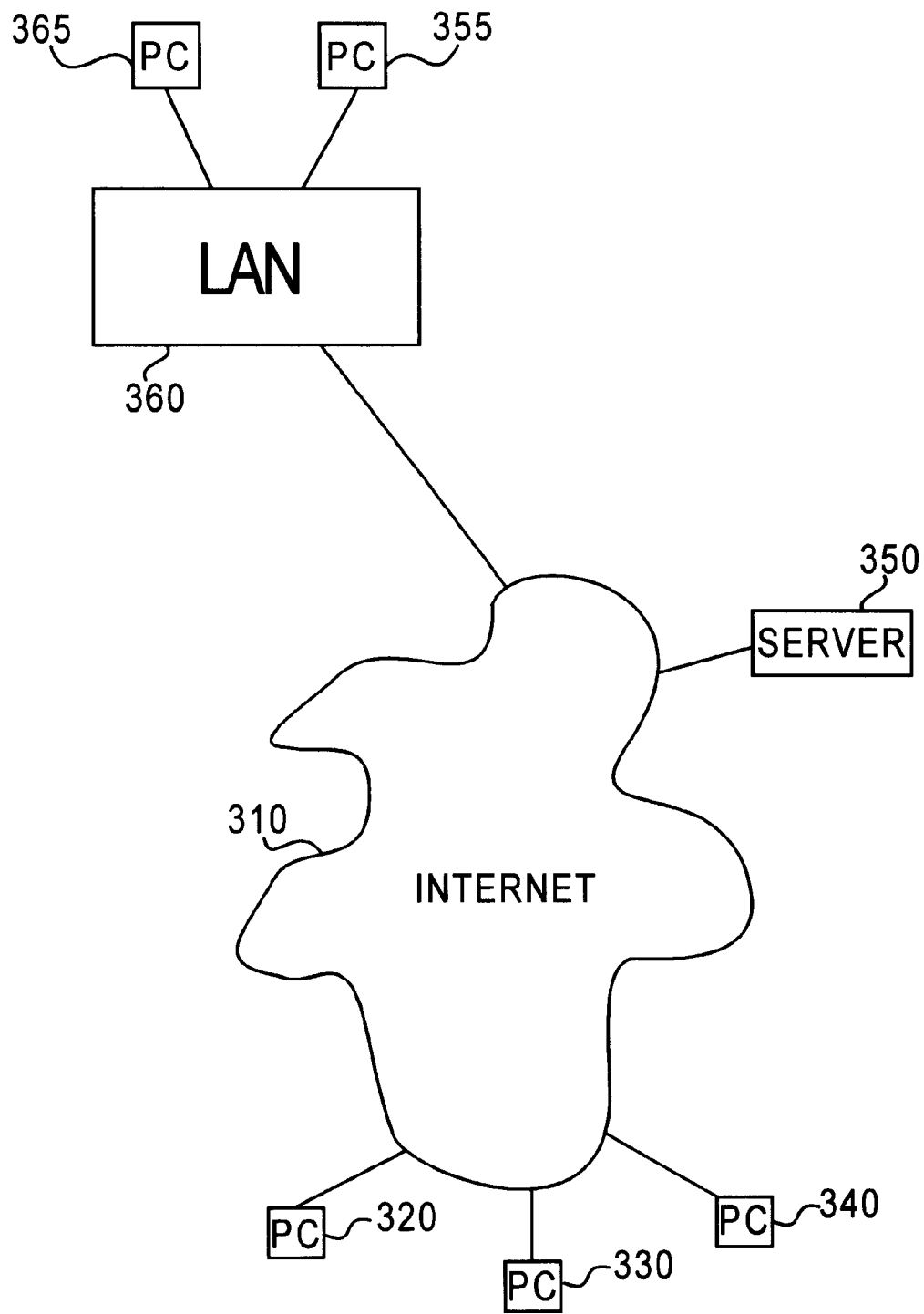
FIG. 3 is a schematic diagram illustrating an embodiment of a computer network which employs an embodiment(s) of an object-based digital signature(s) in accordance with the present invention.

One problem is that this approach does not provide a technique to attest to or validate only a portion of the "document" or a portion of the plurality of electronic signals. If an electronic document is to be "signed" by a digital signature, than it is done to the electronic document as a whole, including, typically, any previous digital signatures used to validate the document, for example. Thus, where two individuals successively "sign" a "document," for example, the second signer validates both the document and the first signer's signature. Likewise, known techniques for using a digital signature do not allow for a document to be electronically distributed, in hypertext fashion, as an example, so that portions of the document reside in physically distributed storage media. However, if such an approach were available, it may prove useful in networking applications, such as over a local area network (LAN) or over the Internet, such as illustrated in FIG. 3, for example. Although, of course, the invention is not limited in scope in this respect.

The ability to validate a "document" may prove especially important as use of the Internet and the World-Wide Web continues to increase. The World-Wide Web (WWW) comprises a multimedia-enabled hypertext system used for navigating the Internet. The WWW handles data which may be stored on a computing platform, and may be used with an Internet connection and a WWW browser. The WWW is made up of hundreds of thousands of interconnected pages or documents which may be displayed on a monitor coupled to the computing platform, such as via a system bus. Each page may be coupled to other pages which may be held on any computing platform coupled to the Internet. Therefore, validating or verifying documents, such as the source of a document, in this environment may prove useful.

The WWW is based on the concept of hypertext which is very similar to ordinary text, except that for hypertext, coupling to other parts of the text or to other documents may be hidden behind words and phrases. Coupling to these hypertext are referred to as hypertext links and they allow the user to read the document in any order desired. The WWW also utilizes hypermedia which allows links to couple to not only words but also with pictures, sounds and any other data files which may be stored on a computing platform.

More specifically, hypermedia is a method for coupling data files together regardless of their format. The hypermedia links held on a given WWW page describe the location of the document which a WWW browser should display by using a Uniform Resource Locator (URL). URLs enable WWW browsers to go to any file held on any WWW server. URL is a naming system, typically consisting of three parts, the transfer format (also known as the protocol type), the host name of the machine or platform which holds the file (may also be referred to as the WWW server name) and the path name to the file. The transfer format for standard WWW pages is referred to as Hypertext Transfer Protocol (HTTP). Standard Internet naming conventions are utilized for the host name portion of the URL. UNIX® directory naming conventions are utilized to indicate the path name of the file.

A WWW browser may be used to send and receive data using HTTP as well as to access all of the popular Internet resources in a manner which may be reached through the WWW. More specifically, a WWW browser exists in the form of client software which may be run on a computer able to access different resources including USENET, FTP, Archie, etc. from one common user interface. Currently there are many different WWW browsers available. The most well known WWW browsers are Mosaic® and its progeny, such as NETSCAPE NAVIGATOR®.

Thus, coupling via the Internet, documents or portions of documents may be accessed or provided by an electronic computing device, such as a personal computer (PC). Unfortunately, current approaches to the use of digital signatures do not address validating portions of documents residing on physically distributed storage media.

Figure 4:
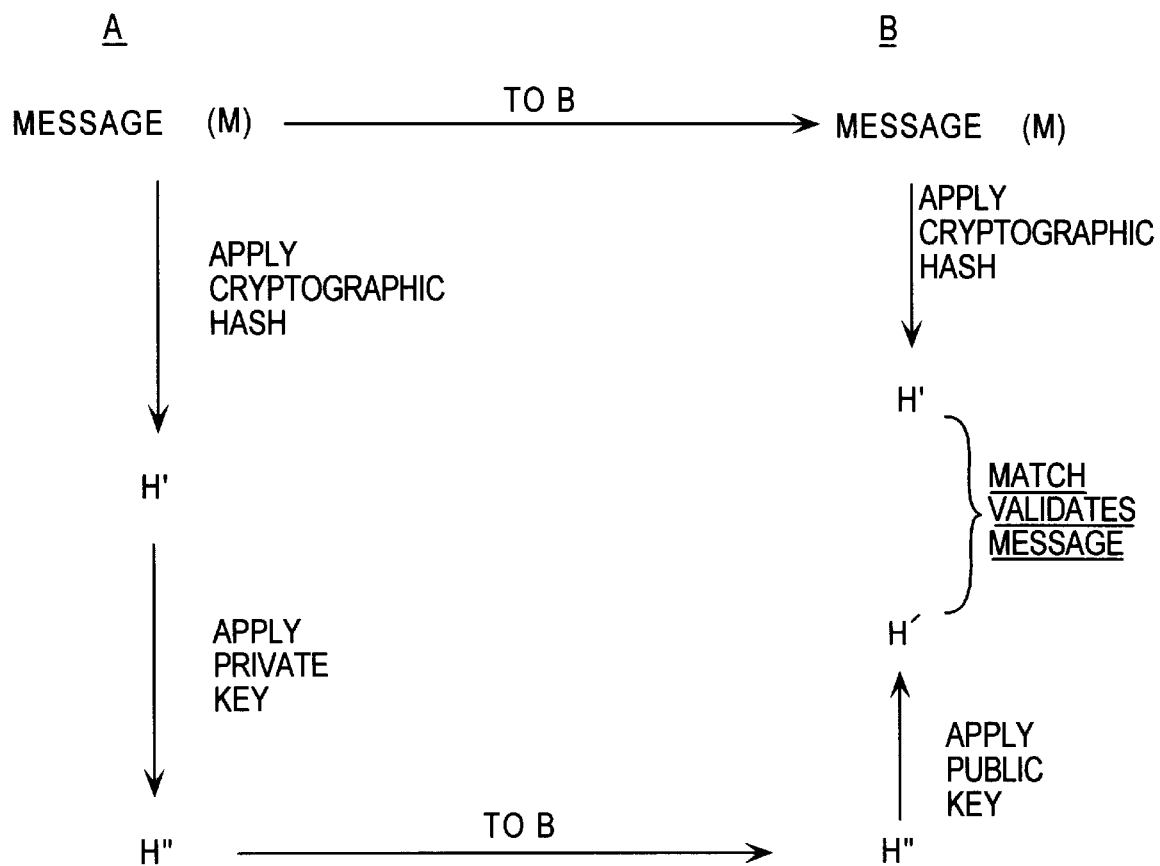
FIG. 4 is a schematic diagram illustrating the application of a digital signature to verify a transmitted message.

Another problem associated with the current use of digital signatures is identification of the party or entity that originally signed the document. The digital signature is the result of the signer's private key having encrypted the resultant value of a cryptographic hash being applied to the stored electronic signals or message, as illustrated in FIG. 4, for example. Cryptographic hash's are well-known and described, for example, in the aforementioned Schneier text. One example of a cryptographic hash, without limitation, is "Proposed Federal Information Processing Standard for Secure Hash Standard," published in the Federal Register, vol. 57, no. 21, Jan. 31, 1992, pp 3747–3749, herein incorporated by reference. As illustrated in FIG. 4, a cryptographic hash is applied to the message to be communicated. The result is H'. Then, a private key is applied to the H' so that it is encrypted, producing H". When B receives the message M with the digital signature H" attached, B can apply the cryptographic hash to the message M to produce H' and apply the public key corresponding with A's private key to H". If these two resulting values match, this confirms that B has received a valid message from A. Typically, the public key technique and the cryptographic hash technique used are specified in the digital signature string. However, the identification of the signer and the signer's public key may not be included in the signature string. Furthermore, there is no explicit reference to any additional information about the signer, such as authorization or the signer's digital certificate, included in either the digital signature string or the electronic document being signed. See, for example, Public-key Cryptography Standards (PKCS) #7, Cryptographic Message Syntax Standard, Version 1.5, available from RSA Laboratories, November, 1993, herein incorporated by reference.

Figure 2:
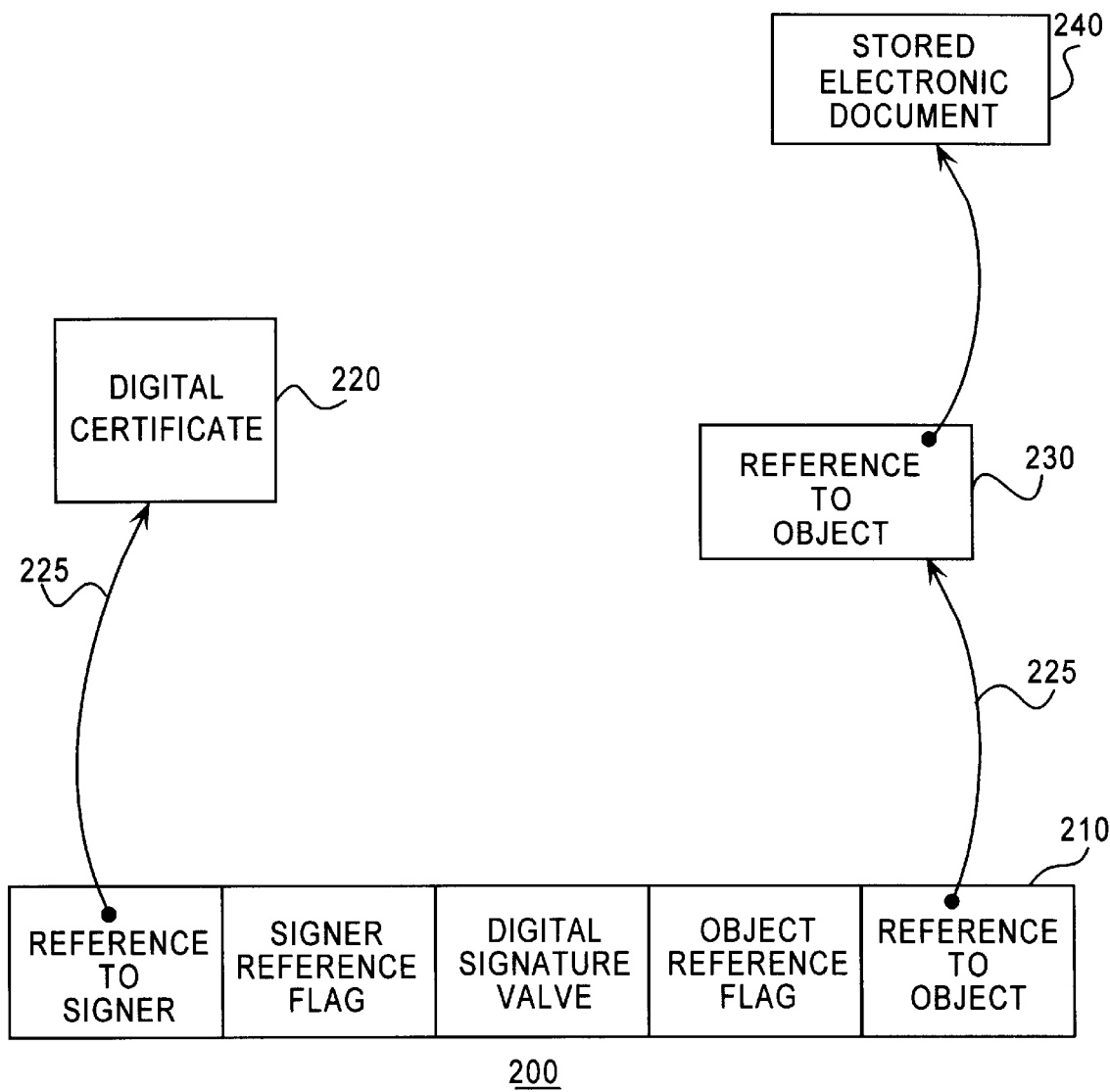
FIG. 2 is a schematic diagram illustrating another embodiment of an object-based digital signature in accordance with the present invention.
Figure 5:
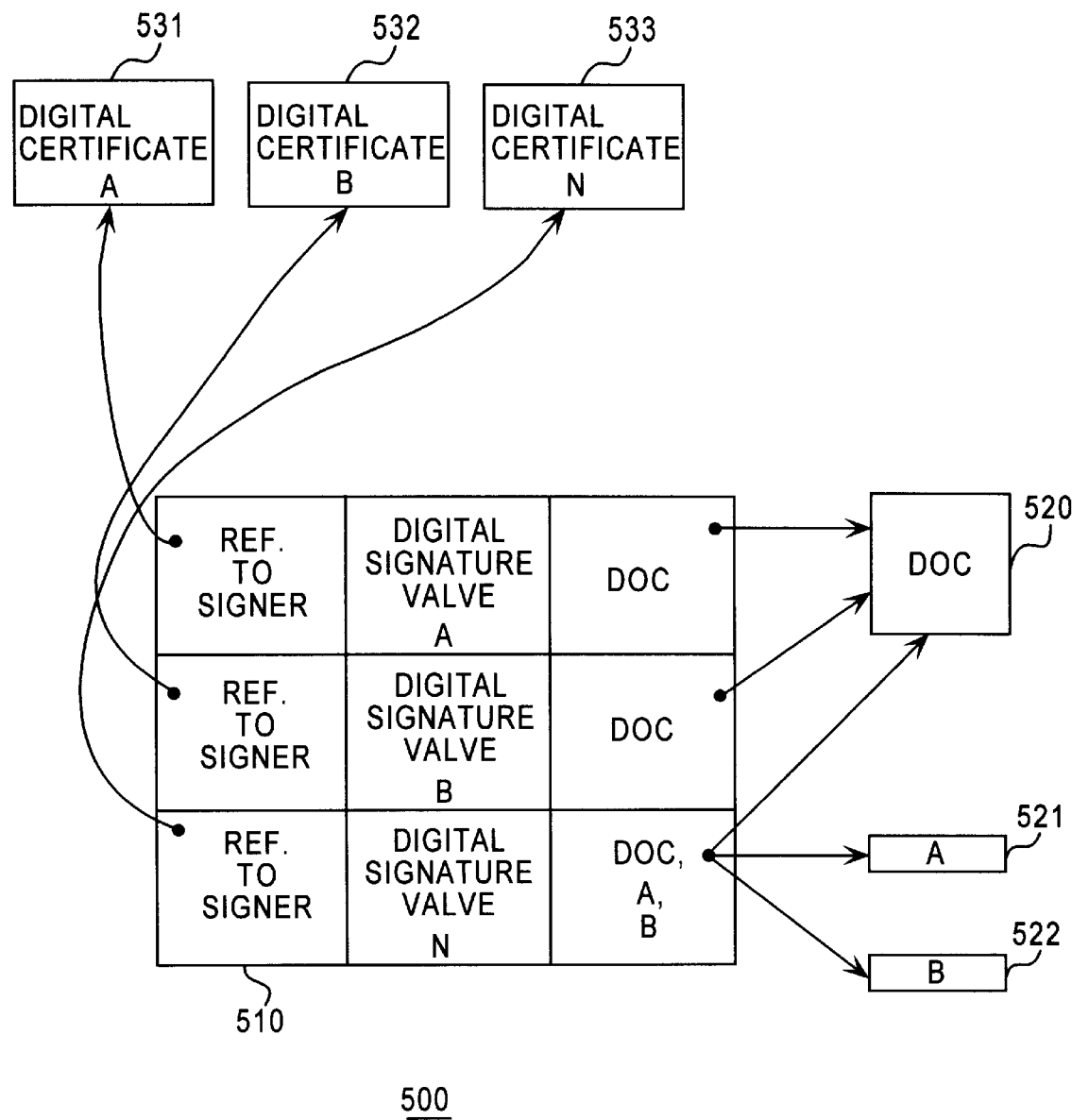
FIG. 5 is a schematic diagram illustrating yet another embodiment(s) of an object-based digital signature(s) in accordance with the present invention.

An embodiment of an object-based digital signature in accordance with the present invention, such as the embodiment illustrated in FIG. 1, addresses these problems. FIG. 1 is a schematic diagram illustrating one embodiment 100 of an object-based digital signature in accordance with the present invention. It will, of course, be appreciated that the invention is not limited in scope to the particular embodiment illustrated. Embodiment 100 illustrated in FIG. 1 demonstrates a technique of using a digital signature, referred to in this context as an embodiment of an object-based digital signature, in which a set of associated stored electronic signals 110, (1) identify a remotely stored object being verified or validated, such as signals 130 representing a stored electronic document, (2) identify a remotely stored object that identifies the party validating the document, such as signals 120 representing a digital certificate, and (3) includes the resultant digital signature value, stored as electronic signals obtained based, at least in part, on remotely stored signals 130. That is, in this embodiment, the digital signature value is obtained by encrypting the cryptographic hash of signals 130. In this particular embodiment, electronic signals 110 reside in substantially the same physical location, such as stored in an electronic file. In this context, an "object" refers to an associated collection of stored electronic signals, in which the collection physically resides in substantially the same location, such as in a file on a particular platform, for example, that may be referenced electronically and substantially unambiguously, such as, for example, stored signals 130. In this context "referenced electronically" refers to the ability to access the object over a network electronically. Likewise, in alternative embodiments, more than one object to be verified may be electronically referenced in an embodiment in accordance with the present invention, as illustrated in FIG. 5, for example. In one embodiment, the object to be verified may comprise a stored electronic file referred to by a hypertext link, such as is typically used over the Internet, for example, although the invention is not limited in scope in this respect. This type of linking is illustrated in FIG. 1 by arrows 125. Thus, in this embodiment, the reference to an object being verified or validated may comprise an electronic pointer to the object being verified. Such a pointer, for example, may comprise a URL or other naming convention employed to identify an electronic file across a network. It is, likewise, noted that, in an alternative embodiment, the reference to object may electronically point to a set of electronic signals comprising yet another electronic pointer, as illustrated in FIG. 2 and described in more detail below. In this context, the use of more than one electronic pointer is referred to as "indirect electronic referencing".

Figure 7:
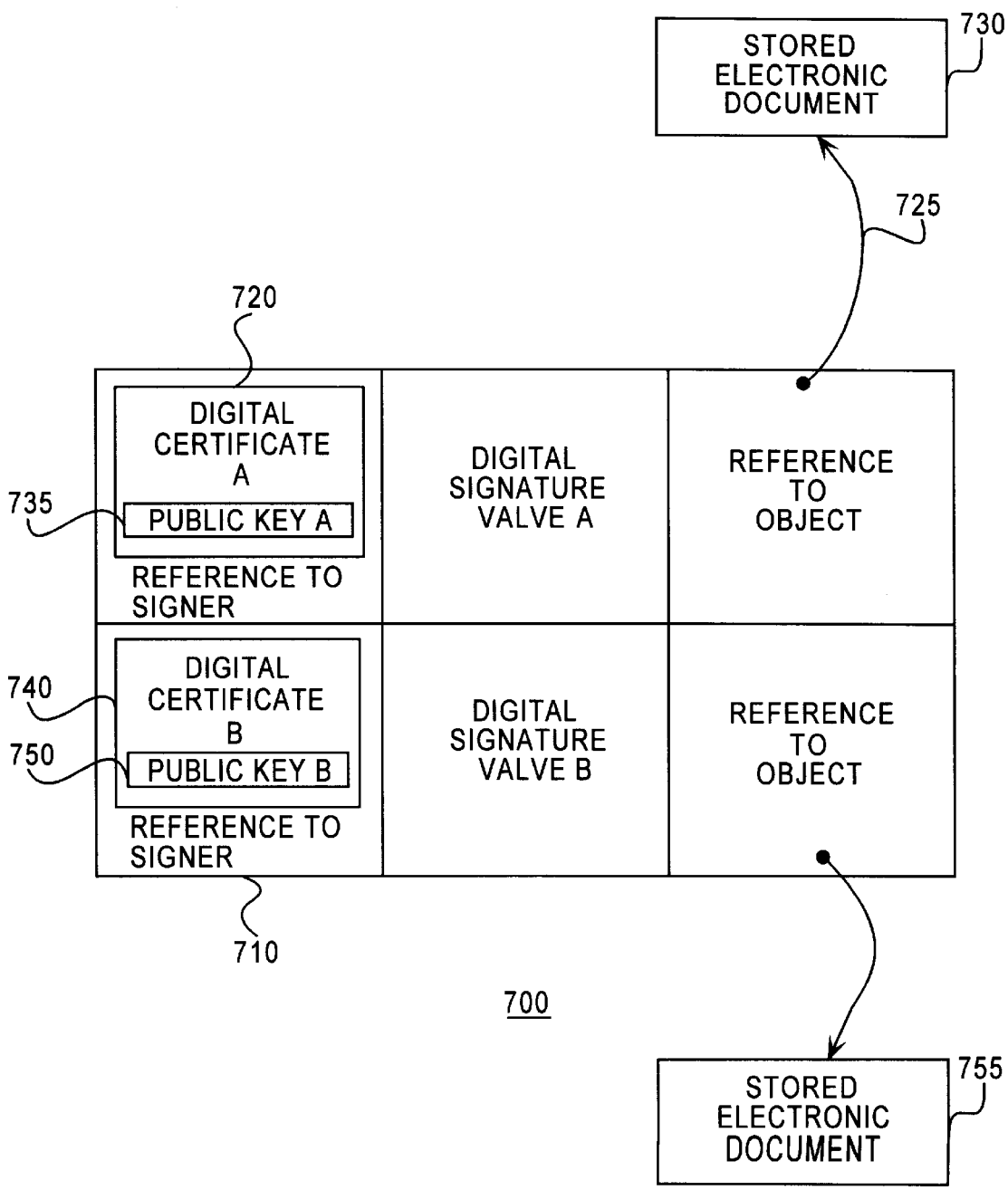
FIG. 7 is a schematic diagram illustrating still another embodiment(s) of an object-based digital signature(s) in accordance with the present invention.

Likewise, a reference to the party validating the document may comprise a stored set of electronic signals that may be used to validate or verify the party, such as a digital certificate that may be incorporated into stored signals 110. This approach is illustrated in FIG. 7, for example. Alternatively, as illustrated in FIG. 1, the reference to the party validating the document may electronically reference stored electronic signals, such as digital certificate 120. In this particular embodiment, these stored electronic digital signals may include identifying information regarding the party and the party's public key. This, as illustrated, public key 122 corresponds to the private key employed to produce the digital signature value by encrypting the cryptographic hash of signals 130. Alternatively, the referenced electronic digital signals may also electronically reference, such as via a hypertext link, for example, a digital certificate of the party that includes such information. Likewise, additional information may be included in the digital certificate, such as signature authorization in accordance with CCITT Recommendation X.509, "Security Architecture for Open Systems Interconnection for CCITT Applications," International Telephone and Telegraph, International Telecommunications Union, Geneva, 1991, herein incorporated by reference, for example.

In this particular embodiment, the digital signature value comprises a string of electronic signals that identifies the signature method and the cryptographic-method used and the value created as a result of encrypting the cryptographic hash value of the object electronically referenced to be validated or verified with the party's private key. The invention is, of course, not limited in scope in this respect.

FIG. 2 is a schematic diagram illustrating another embodiment 200 of an object-based digital signature in accordance with the present invention. This embodiment is similar to the embodiment illustrated in FIG. 1 with some additional features. As illustrated, in this particular embodiment, a reference flag for the party validating the document and an object reference flag is included. The reference flag for the party providing validation indicates whether the reference to the party is "by value" or "by reference". The flag may take any form, such as a binary signal, although the invention is not limited in scope in this respect. In alternative embodiments, additional levels of indirect referencing may be employed. Therefore, this flag indicates whether the reference to the party is a pointer to the party's digital certificate or whether the digital certificate is incorporated in stored electronic signals 210 for this embodiment of an object-based digital signature. Likewise, the object reference flag indicates whether the reference to an object to be validated is signed "by value" or "by reference". Therefore, in this particular embodiment, this flag indicates whether the digital signature value corresponds to the digital signature value obtained from encrypting the cryptographic hash of reference to object 230 in FIG. 2 or encrypting the cryptographic hash of stored signals 240 in FIG. 2. In this particular example, both 230 and 240 are encrypted to produce the digital signature value.

As the previous descriptions illustrate, an embodiment of an object-based digital signature in accordance with the present invention provides a great deal of flexibility and a number of advantages over the current approach to employing digital signatures. An embodiment of an object-based digital signature in accordance with the invention may allow digital signatures to approve or verify portions of documents, may address issues associated with the temporal ordering of digital signatures, and may allow information dispersed over a network of computing systems, such as the WWW, for example, to be verified or approved.

FIG. 5 illustrates yet another embodiment 500 of an object-based digital signature in accordance with the present invention. This particular embodiment illustrates an object-based digital signature in accordance with the present invention used to validate a typical transaction. In this particular embodiment, document 520 comprises electronic signals that may represent a contract, for example, or some other type of legal document. In this particular embodiment A and B shall approve or validate the document and then N shall approve or validate the document and A's and B's approval. In this particular embodiment, electronic signals 510 are stored as a file. Likewise, A approves document 520 by employing a pointer to document 520 and a pointer to a digital certificate, illustrated as electronic signals 531, and providing digital signature value A, which comprises electronic signals representing the encryption of the cryptographic hash of document 520 using A's private key. B approves document 520 in a similar manner by pointing to document 520, pointing to a digital certificate, and providing digital signature value B in the form of electronic signals. Likewise, N approves the document including A's approval and B's approval by pointing to the document and pointing to A's signature and B's signature. These stored electronic signals, such as 520, 521, 522, 531, 532, and 533, are stored in physically distributed media in this particular embodiment. Likewise, digital signature value N provides the encrypted value of the cryptographic hash using N's private key applied first to document 520 and then applied to A's signature and finally B's signature in this particular example. Likewise, electronic signals 510 also point to electronic signals 533 representing N's digital certificate. Thus, in this particular embodiment, an object-based digital signature in accordance with the invention allows digital signatures to approve or validate portions of documents, allows information dispersed over a network of computing systems to be validated or approved, and also addresses issues associated with the temporal ordering of digital signatures. For example, in this embodiment, N approved A's signature and B's signature, thereby imposing a temporal order upon the approvals.

Figure 6:
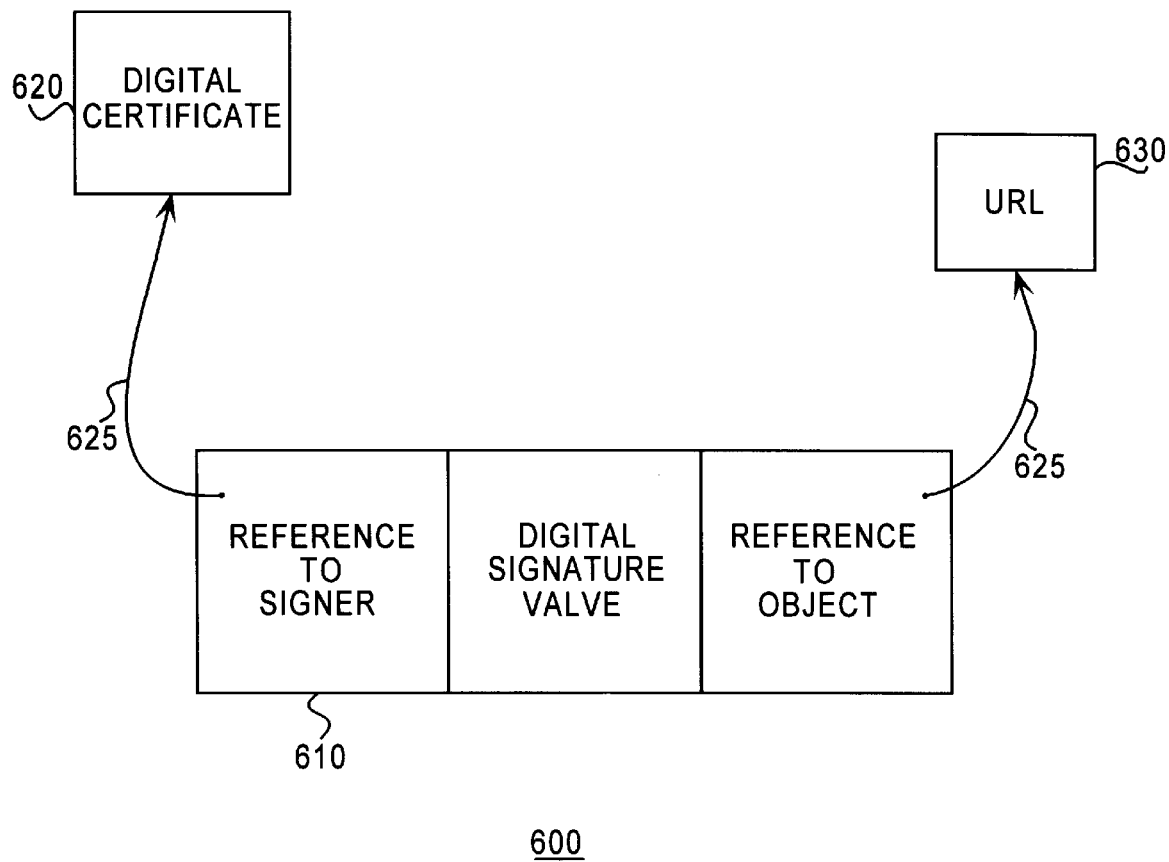
FIG. 6 is a schematic diagram illustrating yet one more embodiment of an object-based digital signature in accordance with the present invention.

FIG. 6 illustrates yet another embodiment 600 of an object-based digital signature in accordance with the invention. This embodiment has additional similarities and differences with respect to the previously described embodiments. In this particular embodiment, the object-based digital signature is employed to approve a URL rather than an electronic document. Thus, information stored electronically and provided via this URL has been approved by the party whose digital certificate is referenced, in this particular embodiment. More specifically, the information pointed to by the URL is validated. Use of this embodiment in accordance with the present invention provides a number of advantages. For example, up-to-date information may be provided with the validity of the information approved by the party whose digital certificate is referenced. For example, businesses or companies may do this for their WWW website accessible via the Internet. Likewise, software may be provided and a party may download it with knowledge that the risk of viruses is significantly reduced or removed due to the authentication provided by the party validating the URL. Likewise, by a similar technique, a particular network path may be approved or validated. For example, a platform coupled to a network and a directory path for that platform may be validated by this technique in accordance with the present invention.

FIG. 7 illustrates yet another embodiment 700 of an object-based digital signature in accordance with the invention. As illustrated, in this particular embodiment, the digital certificate, such as digital certificates 720 and 740, are included in stored electronic signals 710 instead of being referenced electronically. Likewise, FIG. 7 illustrates public key 735 corresponding to the private key employed to produce digital signature value A. FIG. 7 also illustrates public key 750 corresponding to the private key employed to produce digital signature value B. Of course, as previously indicated, an object-based digital signature in accordance with the invention is not limited to this particular embodiment.

FIG. 3 illustrates personal computers (PCs) 320, 330 and 340 coupled to the Internet 310. Likewise, Local Area Network (LAN) 360 and server 350 are coupled to the Internet and PCs 355 and 365 are coupled to LAN 360. It will now be appreciated that a computing platform may include an electronic storage medium including machine-readable computer code resident thereon that is adapted so that during execution of the computer code electronic signals are produced that electronically reference at least one plurality of electronic signals with a digital signature stored remotely from the plurality. In such an embodiment, the digital signature may comprise electronic signals representing the encrypted cryptographic hash value of the electronically referenced at least one plurality of electronic signals. For example, in this particular embodiment, the PC's illustrated in FIG. 3 comprise such a platform, although the invention is not limited in scope in this respect. The electronic storage medium in this particular embodiment is coupled to an execution unit, such as a microprocessor, via a system bus. Likewise, the machine-readable computer code resident on the PC's in FIG. 3, may be further adapted to include additional aspects of an object-based digital signature in accordance with the present invention discussed in connection with previously described embodiments. For example, in this particular embodiment, such code would include the capability to reference other pluralities of electronic signals, perform indirect referencing, reference a digital certificate, and the capability to reference electronic signals stored in physically distributed storage media coupled at least in part via the Internet or LAN 360, to name a few examples.

While certain features of the invention have been illustrated as described herein, many modifications, substitutions, changes and equivalents will now occur to those skilled in the art. For example, an embodiment in accordance with the invention may be applied to a document comprised entirely of hypertext links. In such an embodiment, the digital signature value may be obtained by encrypting all the files referenced by the document comprised of hypertext links in the order in the document comprised of hypertext links. It is, therefore, to be understood that the appended claims are intended to cover all such modifications and changes as fall within the true spirit of the invention.

What is claimed is:

1. A method of using a digital signature comprising: electronically referencing at least one plurality of electronic signals with a digital signature remotely stored from the plurality;
    wherein electronically referencing at least one plurality of electronic signals with a digital signature remotely stored from the plurality comprises:
        also electronically referencing other pluralities of stored electronic signals with respective other digital signatures remotely stored from the other pluralities; and
    wherein the respective digital signatures comprise:
        electronic signals representing the encrypted cryptographic hash value of the respective electronically referenced pluralities of electronic signals; and
        at least one of the respective digital signatures references a remotely stored other reference to the at least one plurality and other pluralities of stored electronic signals.

2. The method of claim 1, wherein electronically referencing at least one plurality of stored electronic signals comprises electronically referencing the at least one plurality by electronically pointing to an electronic pointer that points to the at least one plurality.

3. The method of claim 1, wherein the at least one plurality is electronically referenced indirectly.

4. The method of claim 1, wherein said remotely stored other reference comprises a Uniform Resource Locator (URL).

5. The method of claim 1, wherein said remotely stored other reference comprise a network path.

6. The method of claim 1, wherein the digital signature comprises a first plurality of stored electronic signals, the first plurality being stored together with a second plurality of electronic signals; the second plurality of electronic signals comprising electronic signals representing a digital certificate.

7. The method of claim 6, wherein the digital certificate includes stored electrical signals representing at least a public key corresponding to the private key employed to produce said digital signature.

8. The method of claim 1, and further comprising electronically referencing a separate plurality of electronic signals, the separate plurality comprising a digital certificate.

9. The method of claim 8, wherein the digital certificate includes stored electronic signals representing at least a public key corresponding to the private key employed to produce said digital signature.

10. The method of claim 1, wherein the pluralities are stored in physically distributed storage media.

11. The method of claim 10, wherein the physically distributed storage media are coupled at least in part via the Internet.

12. The method of claim 10, wherein the physically distributed storage media are coupled at least in part via a Local Area Network (LAN).

13. A platform comprising: an electronic storage medium including machine-readable computer code resident therein, said machine-readable computer code being adapted to produce a first plurality of electronic signals, during execution, that electronically reference at least one other plurality of electronic signals with a digital signature remotely stored from the first plurality, wherein the digital signature comprises electronic signals representing the encrypted cryptographic hash of the electronically referenced at least one other plurality of electronic signals and the machine-readable code is further adapted to produce electronic signals, during execution, that reference other pluralities of electronic signals; and at least a portion of the at least one other plurality and other pluralities comprise at least one other reference to other remotely stored electronic signals.

14. The platform of claim 13, wherein the pluralities are stored in physically distributed storage media.

15. The platform of claim 13, wherein one of the other pluralities of electronic signals comprises a digital certificate.

16. The platform of claim 13, wherein the at least one plurality of electronic signals is referenced indirectly.

17. The platform of claim 13, wherein one of the other pluralities of electronic signals is referenced indirectly.

18. The platform of claim 13, wherein the at least one other reference comprises a Uniform Resource Locator (URL).

19. The platform of claim 13, wherein the at least one other reference comprises a network path.

20. A network comprising: a plurality of coupled computing platforms, each of said computing platforms including an electronic storage medium; at least one platform including a first plurality of electronic signals that electronically reference with a digital signature at least one other plurality of electronic signals remotely stored from the digital signature, the digital signature comprising electronic signals representing the cryptographic hash value of the electronically referenced at least one other plurality of electronic signals; wherein the first plurality of electronic signals that electronically reference with a digital signature the at least one other plurality of electronic signals remotely stored from the digital signature also electronically reference other pluralities of electronic signals; and at least a portion of the at least one other plurality and other pluralities comprise at least one other reference to other remotely stored electronic signals.

21. The network of claim 20, wherein the pluralities are stored in physically distributed storage media.

22. The network of claim 20, wherein one of the other pluralities comprises a digital certificate.

23. The network of claim 20, wherein the at least one plurality of electronic signals is referenced indirectly.

24. The network of claim 20, wherein one of the other pluralities of electronic signals is referenced indirectly.

25. The network of claim 20, wherein the at least one other reference comprises a Uniform Resource Locator (URL).

26. A method of using a digital signature comprising: electronically referencing more than one plurality of electronic signals with a digital signature remotely stored from the more than one plurality; and electronically referencing remotely from the digital signature a plurality of electronic signals comprising a digital certificate, the digital certificate comprising electronic signals representing the public key corresponding to the private key used to produce the digital signature, wherein at least a portion of at least one plurality of the more than one plurality comprises at least one other reference to other remotely stored electronic signals.

\* \* \* \* \*

UNITED STATES PATENT AND TRADEMARK OFFICE
CERTIFICATE OF CORRECTION

PATENT NO.    : 6,253,323 B1                                          Page 1 of 1
DATED         : June 26, 2001
INVENTOR(S)   : Cox et al.

It is certified that error appears in the above-identified patent and that said Letters Patent is hereby corrected as shown below:

Column 2,
Line 30, insert -- ( -- before "electronic".

Signed and Sealed this

Seventh Day of May, 2002

*Attest:*

*Attesting Officer*

JAMES E. ROGAN
*Director of the United States Patent and Trademark Office*